United States Patent [19]

Coyle, Jr. et al.

[11] Patent Number: 5,129,086
[45] Date of Patent: Jul. 7, 1992

[54] SYSTEM AND METHOD FOR INTERCOMMUNICATING BETWEEN APPLICATIONS AND A DATABASE MANAGER

[75] Inventors: Daniel J. Coyle, Jr.; Dan C. Hargrove; John M. McConaughy, all of Austin, Tex.

[73] Assignee: International Business Machines Corporation, Armonk, N.Y.

[21] Appl. No.: 277,386

[22] Filed: Nov. 29, 1988

[51] Int. Cl.⁵ .......................... G06F 9/44; G06F 15/40
[52] U.S. Cl. ............................... 395/650; 364/DIG. 1; 364/282.1; 364/282.2; 364/281.3; 364/239.9; 364/974; 364/977
[58] Field of Search ... 364/200 MS File, 300 MS File; 395/600, 650

[56] References Cited

U.S. PATENT DOCUMENTS

| | | | |
|---|---|---|---|
| 4,374,409 | 2/1983 | Bienvenu et al. | 395/650 |
| 4,435,753 | 3/1984 | Rizzi | 395/700 |
| 4,667,290 | 5/1987 | Goss et al. | 395/700 |
| 4,670,848 | 6/1987 | Schramn | 395/60 |
| 4,782,444 | 11/1988 | Munshi et al. | 395/700 |
| 4,783,752 | 11/1988 | Kaplan et al. | 395/64 |
| 4,860,203 | 8/1989 | Corrigan et al. | 395/700 |
| 4,931,928 | 6/1990 | Greenfeld | 364/281.4 |
| 4,947,315 | 8/1990 | Sokolow et al. | 395/700 |

OTHER PUBLICATIONS

Duncan, Ray; "A Programmer's Introductoin to OS/2"; Byte; Sep. 1987; pp. 101–107.
White et al.; "Microsoft's New DOS"; Byte; Jun. 1987; pp. 116–126.
Atkinson et al.; "Context Sensitive Editing as an Approach to Incremental Compilation"; The Computer Journal vol. 24, No. 3, 1981; pp. 222–229.

Primary Examiner—Thomas C. Lee
Assistant Examiner—Krisna Lim
Attorney, Agent, or Firm—Robert M. Carwell

[57] ABSTRACT

An interfacing system and method for use in computerized systems for intercommunication between application and database systems. A plurality of generic application program interfaces are employed as an interface for use in precompiler development as a runtime interface target to initialize data structures with data required to perform runtime database query language-related functions. The application program is isolated from the database kernel interface facilitating alteration of the database kernel interface without affecting the application program or user-developed precompilers. Parameters used by the interface are employed by applications written to a plurality of host languages. The applications indirectly use these data structures required by the kernel. The interface system supports serialized multiple thread access to the database kernel facilitating performance/functional benefits of multi-threaded applications.

10 Claims, 3 Drawing Sheets

SYSTEM AND METHOD FOR INTERCOMMUNICATING BETWEEN APPLICATIONS AND A DATABASE MANAGER

TECHNICAL FIELD

The invention relates to interfacing in computerized systems and, more particularly, interfacing systems and methods for use in providing intercommunication between applications and database programs or systems.

BACKGROUND ART

In many software systems such as the OS/2 TM Extended Edition 1.0 commercially available from the IBM Corporation, it is conventional to provide a precompiler function with the system. The purpose of the precompiler is to generate a combination of language statements and function calls to set up host data required to process various statements in application programs to be executed with the system. An example of such statements, for example, might be structured query language or SQL statements well known in the art which are high level statements formulated for purposes of accessing a database. It is typical in such systems to provide sets of runtime functions which are not externalized except to the degree that they appear in modified source files after precompilation.

One problem with providing such functions is that they typically are designed to be used specifically by a single language such as the C-Language in the case of the hereinabove-noted OS/2 system. However, application programs typically encountered are written in one of a plurality of languages. Accordingly, the need arose for precompiler developers to be provided with a set of application program interfaces or APIs that they could generate calls to in order to communicate at runtime between a given application and a database manager kernel, for example, wherein these APIs were sufficiently generic in order to be used by various languages. However, the proprietor of the software system typically had a vested interest in protecting the interface to such kernels, wherein it was desired that such APIs serve an additional function as an isolation layer between the given application and the kernel.

Yet additional difficult constraints were imposed upon the highly sought after API system resulting in the failure to provide the much-needed interfaces. In attempting to provide precompiler developers with a runtime interface which would be the target of code generated during precompilation, it was recognized that parameters used by the interface must be simple enough to be employed by a wide variety of host languages such a C, Pascal, COBOL, and FORTRAN among others. Moreover, it was necessary that this runtime interface be flexible enough to allow precompilers to generate code allowing for optimization of certain runtime characteristics, such as storage requirements, execution speed, and the like. Still further compounding the problem in delivering such an interfacing system was the need for the runtime interface to provide for application developers' creation of multi-threaded applications to provide performance or functional benefits not obtainable by single-threaded applications. Still further, a system was needed which was capable of identifying which access program to run when it was called from within an application, even when the application was composed of several modules each of which might have a unique access program.

These and other problems have been solved by the present invention wherein an interfacing system and method is provided for interfacing in computer systems to facilitate intercommunication between a wide variety of application and other software system programs.

SUMMARY OF THE INVENTION

An interface system comprised of a plurality of application program interfaces is provided in the form of a set of runtime services which provide a precompiler developer with all functionality required to communicate with a database kernel at runtime. The precompiler generates calls to these APIs based upon tasks specified in a task array by SQLGCMPL during precompilation. In a preferred embodiment eight functions are provided comprising the runtime services: SQLGSTRT, SQLGALOC, SQLGSETV, SQLGUSDA, SQLGSETS, SQLGCALL, SQLGDLOC, and SQLGSTOP. A brief description of each function which will hereinafter be described in greater detail is as follows:

SQLGALOC—update SQLDA ID with a dynamic SQLDA.

SQLGCALL—call the database kernel to run a command.

SQLGDLOC—delete an SQLDA ID and, if dynamic, its SQLDA.

SQLGSETS—register a host variable containing an SQL statement.

SQLGSETV—initialize an SQLVAR element of an SQLDA.

SQLGSTOP—clear the runtime services semaphor.

SQLGSTRT—fetch the semaphor and register the PID and SQLCA.

SQLGUSDA—add an SQLDA ID with a user-defined SQLDA.

The parameters to these functions are created from data returned from the SQLACMPL function or assigned by the precompiler itself. Sufficient flexibility is provided in the runtime services whereby a precompiler may manage the runtime allocation of storage efficiently and optimize execution of the various calls for maximum performance. These optional features in the embodiment may be avoided to facilitate creation of precompilers more easily, or, in the alternative, such features may be incorporated to create more sophisticated precompilers. Such functions are also provided in a form wherein they may be enhanced subsequently as new requirements arise.

By defining the runtime services interface set of the present invention, the application may be isolated from a software kernel such as that of a database manager, thereby permitting change of the actual interface to the kernel without affecting existing programs. Moreover precompiler developers thereby may avoid necessity to create their own set of interfaces to perform functions provided by the interface. The interface of the invention is tailored to the tasks specified by a task array, an output parameter of the precompiler services SQLGCMPL function, whereby precompiler developers may generate calls to the runtime services interface without understanding what the functions are doing. In this manner the system of the invention permits work performed by the runtime services to be altered without affecting user-developed precompilers.

The runtime services use and manipulate data structures required by a given kernel. Some host languages which might desirably be used to interface the kernel cannot manipulate such structures easily if at all. Accordingly the runtime services of the invention provide a way for the host language to use such structures indirectly. Moreover, in accordance with the invention performance may be tuned to specific storage or execution criteria by altering use of the runtime services of the invention. Depending upon which calls are generated and the assigned parameter values, precompiler development is facilitated wherein applications are created which minimize execution time or storage usage. Still further, multiple threads of execution are supported through serialization of the execution of runtime services calls. The application developer is thereby permitted to create multi-threaded applications whereby performance or functional benefits are obtained not otherwise obtainable by a single-threaded application.

BRIEF DESCRIPTION OF THE DRAWING

The novel features believed to be characteristic of the invention are set forth in the appended claims. The invention itself, however, as well as other features and advantages thereof, will be best understood by reference to the following description of the preferred embodiment, when read in conjunction with the accompanying figures, wherein:

DETAILED DESCRIPTION OF THE PREFERRED EMBODIMENT

Figure 1:
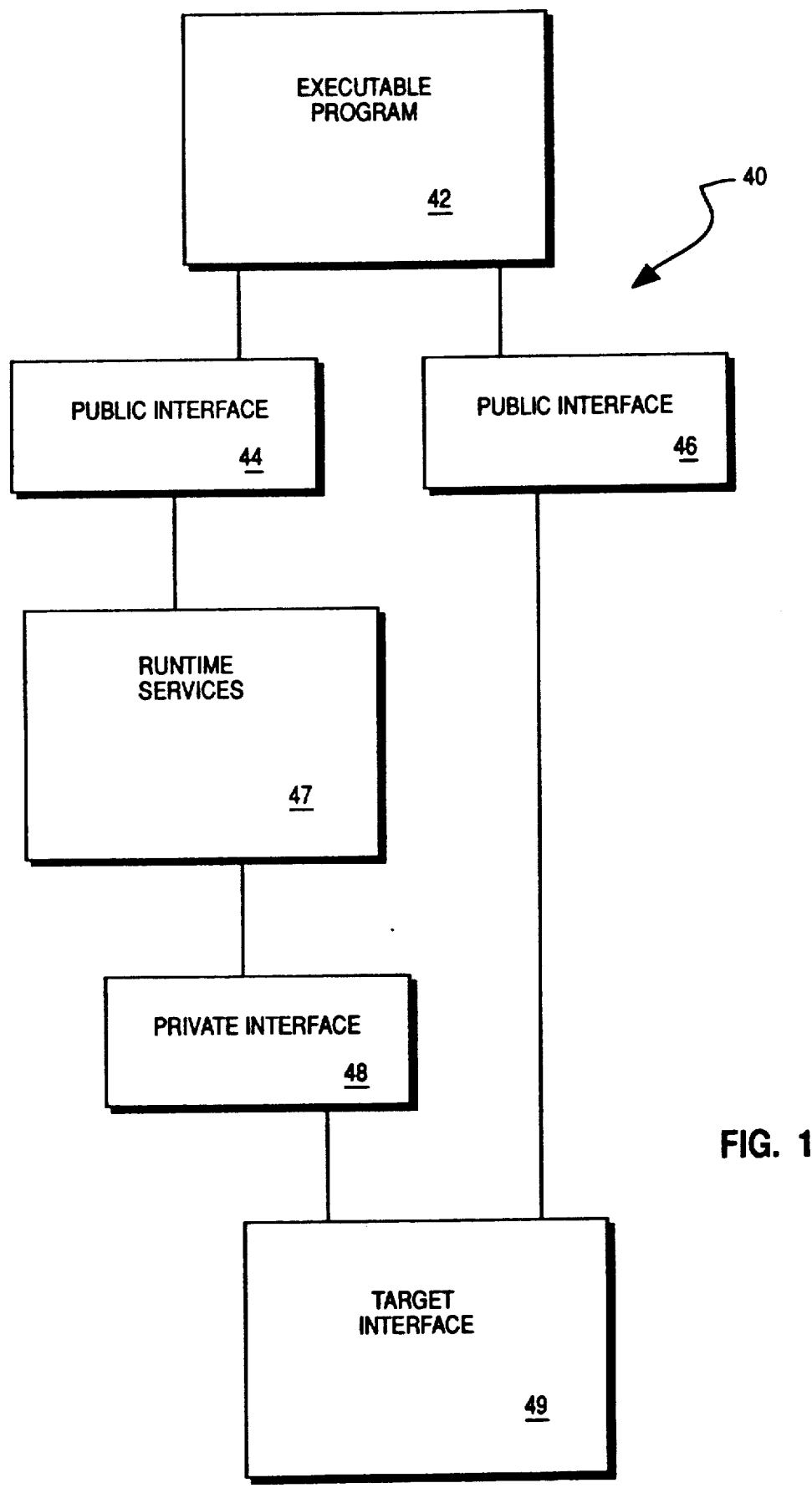
FIG. 1 is a functional block diagram of a representative system of the invention using runtime services to allow an executable program to intercommunicate with a target system whose interface is partially or wholly hidden from the executable program.

FIG. 1 shows a runtime services system 40 of the invention incorporating a set of runtime services 47. The runtime services 47 provide a public interface for the executable program 42 to use to intercommunicate with the target system 49. This is required because the target system 49 requires a private interface 48 that will change over time as the target system 49 is altered to meet new functional or performance requirements. The target system 49 may also have a public interface 46 whose functions are partially or wholly unrelated to those functions provided by the runtime services 47.

Figure 2:
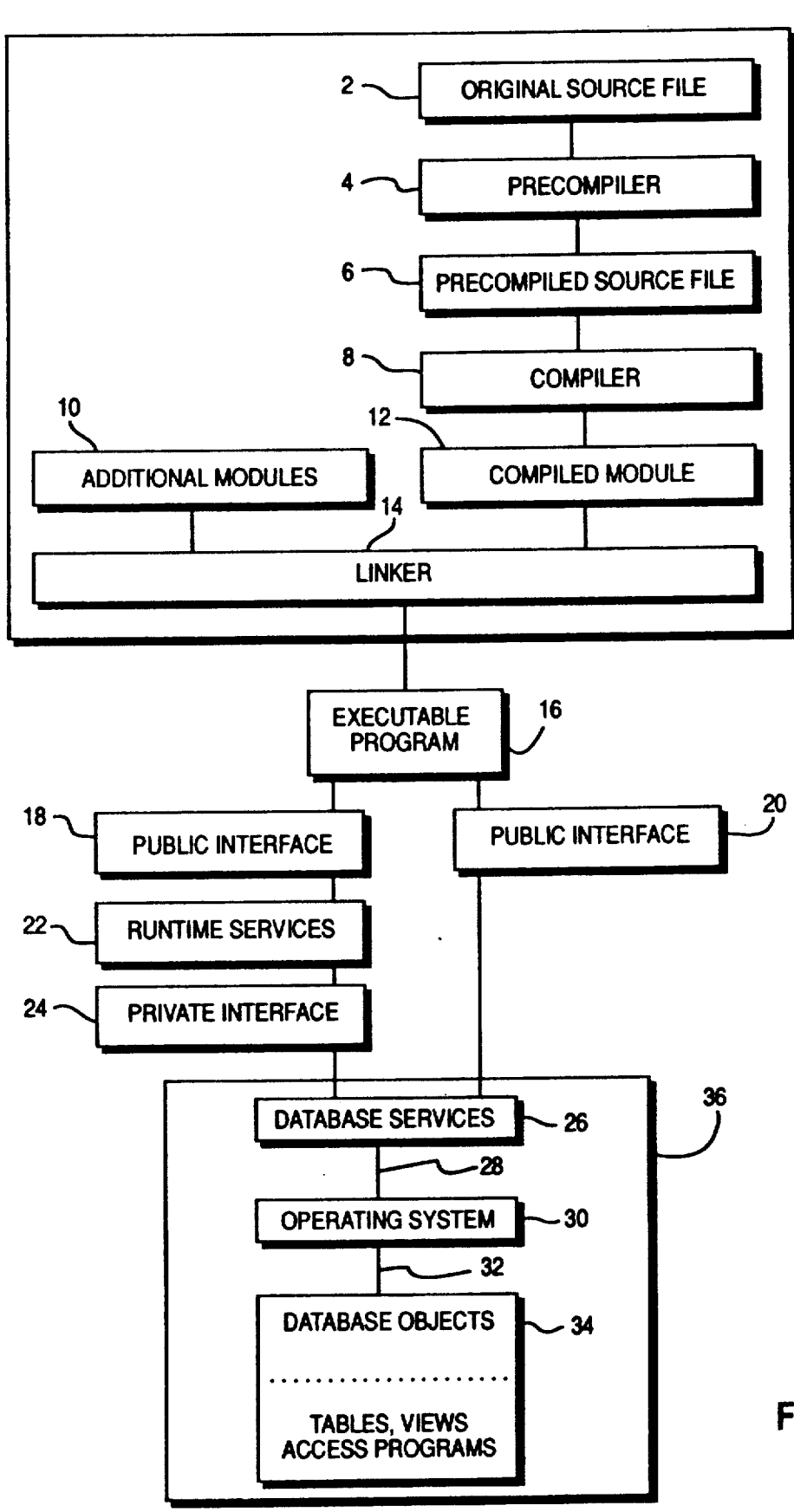
FIG. 2 is a more detailed block diagram illustrating a system that uses a set of runtime services as shown of FIG. 1 and the data flow associated therewith.

Referring now to FIG. 2, a functional block diagram of the invention is shown illustrating the relationship of the runtime services 22 to an executable program 16 and a target system 36 consisting of three subcomponents: database services 26, an operating system 30, and a set of database object 34 which may be tables, views, access programs or the like.

Background information will first be provided for the process 5 pertaining to the creation of the executable program 16 used by this particular implementation of the system illustrated in FIG. 1.

The original source file 2, containing a mixture of host language and SQL statements, is processed by a precompiler 4. The output from the precompiler 4 is a precompiled source file 6 and an access program that is stored as a database object 34 by database services 26 using the operating system 30 file management function.

The precompiled source file 6 has been created so that the SQL statements have been removed or commented out and replaced with code generated by the precompiler 4. This code consists of executable statements, data structures, and/or calls to runtime services 22. The parameters used in these calls contain information required to execute sections of the access program 34, which in turn perform the functions requested by the SQL statements in the original source file 2. The precompiled source file 6 is compiled by the host language compiler 8 to create a compiled module 12, which is then linked by linker 14 to any additional modules 10 used by the application, resulting in an executable program 16.

At runtime, the executable program 16 performs calls to runtime services 22 when it executes the code generated during precompilation 18. The runtime services 22 initialize and maintain specific data structures required by database services 26. One of the calls to runtime services 22 will then call database services 26 through a private interface 24. This private interface 24 can and may be changed as needed, but this will not affect the executable program 16 because the executable program 16 always works through runtime services 22.

The application programmer may have coded explicit calls to the public database services 26 routines, but these calls go through the published database services 26 public interface 20 and perform functions that are essentially unrelated to the functions performed by the database services 26 private interface 24. Application programmers typically would not need to code explicit calls to the runtime services 22 interface 18 or to the database services 26 private interface 24. Whereas this is possible, the parameters of these calls will activate specific sections of the access programs 34 created for the executable program 16, and it is unlikely that the application programmer would set the parameters correctly.

It will be noted that the runtime services 22 are contained in a dynamic link module This means that the code comprising the runtime services is not actually linked to the executable program 16 by the linker 14. Instead, the code is loaded into storage at runtime when the executable program 16 is loaded and executed. Thus, the runtime services 22 can be upgraded and replaced as needed without requiring the applications that use them to be recompiled or relinked. The runtime services 22 must maintain their public interface 18, but the code that comprises the actual runtime services 22 can be modified as needed.

Figure 3:
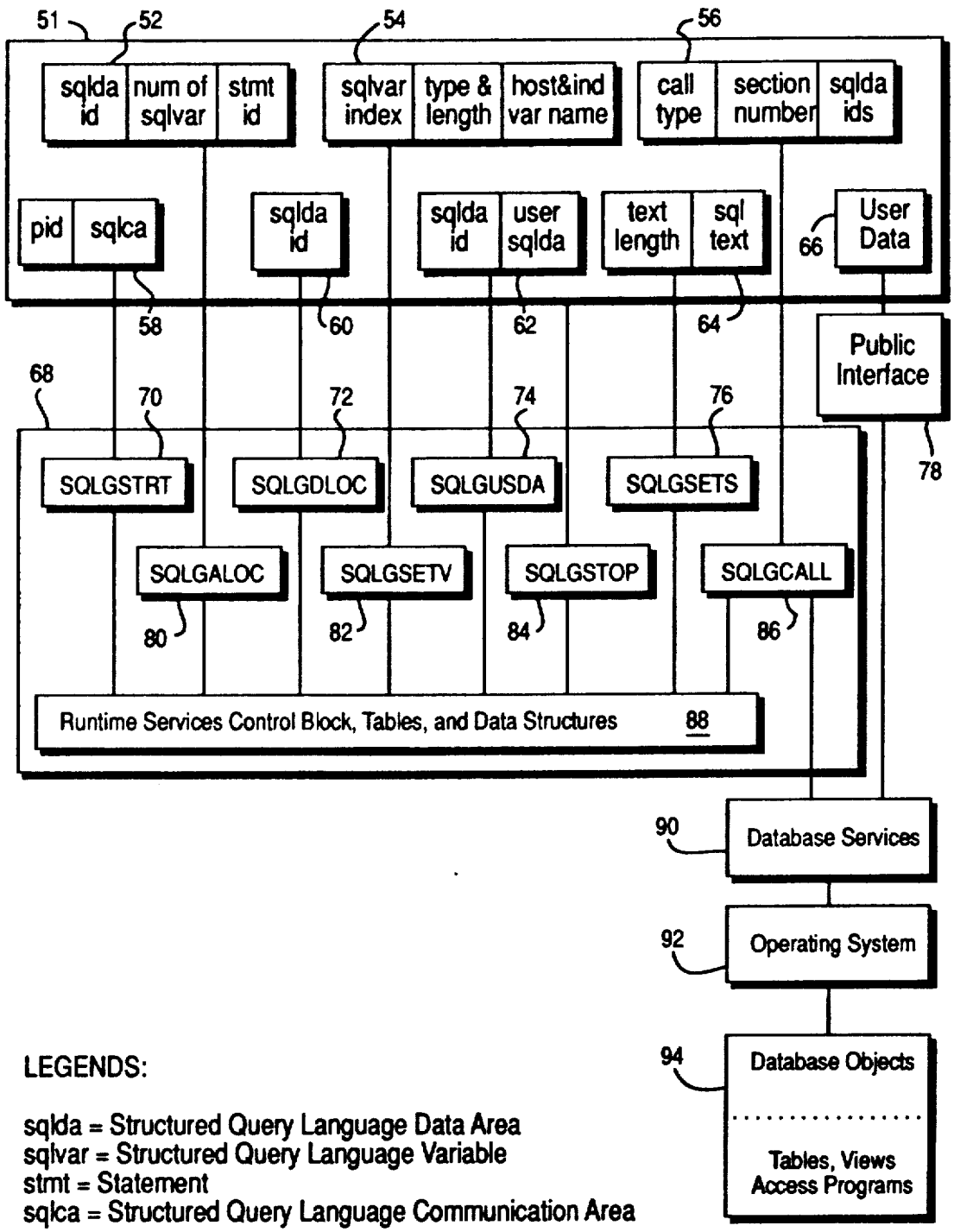
FIG. 3 is a block diagram illustrating the parameters used by the runtime services described for the system illustrated in FIG. 2.

FIG. 3 illustrates the parameters used by the runtime services described in FIG. 2. In FIG. 3, database services 90, operating system 92, and database object 94, have been previously identified in FIG. 2 as 26, 30 and 34 respectively, and serve the same purpose.

The runtime services 68 are defined below along with their parameters. Both the functions and the parameters are based on the target system shown in FIG. 3 as database services 90. The runtime services 68 consist of eight functions that are used in various combinations to support specific statements in the executable program 51 and intercommunicate with database services 90. The executable program 51 may also intercommunicate with database services 90 using a public interface 78.

However, the public interface 78 does not provide the functionality provided by runtime services 68.

The SQLGSTRT 70 function starts a series of calls to runtime services 68. The parameters 58 are the pid, which is a buffer containing application and access program identification data, and the SQLCA which is a communication area used to return status information to the executable program 51. SQLGSTRT 70 stores the pid and the address of the SQLCA in the runtime services control block 88, which can then be accessed as needed by all of the runtime services 68 functions.

SQLGSTRT 70 also obtains a semaphore that is checked by each thread of execution that accesses the runtime services 68 within a single process. This semaphore is released by SQLGSTOP 84, which is called at the end of each series of calls to runtime services 68. The semaphore forces serialized access of the runtime services 68, which is required by database services 90 and to maintain the integrity of the data structures managed by runtime services 68.

The SQLGUSDA 74 function registers an application-defined data structure. The parameters 62 include an SQLDA ID and the address of a data structure. The address of the data structure is stored in the runtime services ID table 88 using the SQLDA ID as the key. The SQLDA ID can then be used in subsequent calls to SQLGCALL 86 to locate the application-defined data structure. The executable program 51 is responsible for setting up the elements of the application-defined data structure.

The SQLGSETS 76 function registers an application-defined data buffer. The parameters 64 include the text length, and the address of a data structure containing the text of a dynamic SQL statement. This data is stored in the runtime services control block 88 and used by certain database services 90 functions.

The SQLGALOC 80 function allocates a dynamic data structure. The parameters 52 include an SQLDA ID, the number of elements required by the data structure, and a statement ID. The SQLDA ID is added to the runtime services ID table 88 or if it already exists, the SQLDA ID is located in the runtime services ID table 88. Then a data structure is allocated, if necessary, to the size determined by the number of elements parameters, and associated with the SQLDA ID. The SQLDA ID can then be used in subsequent calls to SQLGCALL 86 to locate the dynamic data structure associated with the SQLDA ID.

The statement ID is also associated with the SQLDA ID. This is checked when a subsequent call to SQLGALOC specifies the same SQLDA ID is to be reallocated. If the statement ID is the same, then the contents of the data structure do not need to be updated. But if the statement ID is different, then the data structure elements need to be reset. A return code is placed in the SQLCA that can be checked by the executable program to determine which condition exists.

The SQLGSETV 82 function stores data in the dynamic data structure. The parameters 54 are used to set up a specific element of a dynamically allocated data structure. They include the SQLVAR index, which is the subscript of the element being initialized, the data type and length of the SQLVAR element, and the addresses of the host and indicator variables associated with the SQLVAR element. The host and indicator variables are storage areas in the executable program's 51 data space that are used to transfer data between the executable program 51 and database services 90.

The SQLGCALL 86 function calls database services 90 to perform a function. The parameters 56 include the call type, which specifies the type of function requested, the section number, which identifies a section in an access program 94 associated with the executable program 56, and the input and output SQLDA IDs, which identify data structures that contain information about the executable program's data space and the types of data that will be used by the function. The data structures must have already been initialized by the executable program 51 or by calls to other runtime services 88 functions such as SQLGALOC 80 and SQLGSETV 82.

The SQLGDLOC 72 function deallocates a dynamic data structure. The parameter 60 is an SQLDA ID, which identifies a specific data structure previously allocated using SQLGALOC 80 or registered using SQLGUSDA 74. The SQLDA ID is used to locate its associated data structure. If the storage was dynamically allocated (SQLGALOC 80), then it is released. In all cases, the SQLDA ID is removed from the runtime services ID table 88. This call is performed after SQLGCALL 86 because the data structure has served its purpose, which was to provide information about the executable program's data space. Calls to SQLGDLOC 72 are optional. They can be suppressed if the executable application wants to use the same dynamic data structures for subsequent calls to database services 90.

The SQLGSTOP 84 function stops the sequence of calls to runtime services 68. There are no specific parameters to this function, but this function is always called as the last runtime services call in each series of calls. This function is used to release the semaphore obtained by SQLGSTRT 70. This allows another thread within the process to use the runtime services 88 to access database services 90.

While the invention has been shown and described with reference to particular embodiments thereof, it will be understood by those skilled in the art that the foregoing and other changes in form and details may be made therein without departing from the spirit and scope of the invention.

We claim:

1. A method for intercommunicating between application programs and a database manager comprising the computer implemented steps of:

allocating, re-allocating, or de-allocating said dynamic data structures required by said application programs;

registering a user-defined data structure comprised of syntactic structure used by said application programs;

initializing said dynamic and said user-defined data structures;

communicating previously allocated or registered ones of said dynamic data structures and said user-defined data structures, respectively, to said database manager to process a database access statement;

validating content of said user-defined data structure;

communicating access program identification information to said database manager at runtime and wherein said method further includes the computer implemented steps of pre-compiling a source module corresponding to one of said application programs and;

selecting said access program identification information prior to said communicating as a function of information generated from said pre-compiling of said source module.

pre-compiling a source module corresponding to one of said application programs.

2. The method of claim 1 wherein said application programs have multiplied threads, and wherein said method further includes serializing access by said application programs to said database manager from different threads of said multiple threads within said application programs by semaphores.

3. The method of claim 1 further including ensuring validity of said user-defined data structures and said dynamic data structures.

4. The method of claim 1 wherein said database manager includes multiple access programs and wherein said method further includes as one of said steps managing module-specific data required by said application programs using said multiple-access programs.

5. A system for intercommunicating between application programs and a database manager comprising:

means for allocating, re-allocating, or de-allocating dynamic data structures required by said application programs;

means for registering user-defined data structures comprised of syntactic structure used by said application programs;

means interconnected to said means for registering and to said means for allocating, re-allocating, or de-allocating, for initializing said user-defined data structures and said dynamic data structures;

means interconnected between said database manager and said means for initializing, for communicating previously allocated or registered one of said dynamic data structures and said user-defined data structures, respectively, to said database manager to process a database access statement;

means for validating content of said user-defined data structures; and means for communicating access program identification information to said database manager at runtime, wherein said program identification information uniquely identifies database objects required to process said database access statements and wherein said system includes means for pre-compiling a source module corresponding to one of said application programs; and means for selecting said access program identification information prior to said communicating as a function of information generated from said pre-compiling of said source module.

6. The system of claim 5 wherein said application programs have multiple-threads, wherein said system includes means for serializing access by said application programs to said database manager from different threads of said multiple threads within said application programs by semaphores.

7. The system of claim 5 further including means for ensuring validity of said user-defined and said dynamic data structures.

8. The system of claim 5 wherein said database includes multiple access programs; and wherein said system further includes means for managing module-specific data required by said application programs using said multiple access programs.

9. The system of claim 6 wherein said multiple threads of said application programs each have associated therewith respective thread identifications and wherein said means for serializing access by said application programs to said database manager includes means for establishing semaphores functionally related to said thread identifications.

10. The system of claim 5 wherein said database manager includes multiple access programs, each of said multiple access programs being called by a respective one of said application programs;

wherein each of said application programs includes a related source module;

and further wherein said system includes means for pre-compiling each said related source module to generate corresponding source module information; and means for selecting one of said access programs to execute for a corresponding one of said application programs as a function of said corresponding source module information.

* * * * *